(12) United States Patent
Flom

(10) Patent No.: US 7,810,434 B2
(45) Date of Patent: Oct. 12, 2010

(54) HEATED SKI LIFT

(76) Inventor: Allison Flom, 146 Central Park West, Apartment 2E, New York, NY (US) 10023

( * ) Notice: Subject to any disclaimer, the term of this patent is extended or adjusted under 35 U.S.C. 154(b) by 173 days.

(21) Appl. No.: 11/804,159

(22) Filed: May 16, 2007

(65) Prior Publication Data

US 2008/0282928 A1 Nov. 20, 2008

(51) Int. Cl.
*B61B 3/00* (2006.01)
(52) U.S. Cl. .................................................. 104/89
(58) Field of Classification Search ............. 104/173.1, 104/173.2, 89, 90
See application file for complete search history.

(56) References Cited

U.S. PATENT DOCUMENTS

| | | |
|---|---|---|
| 3,810,427 A | 5/1974 | Peck |
| 3,942,452 A | 3/1976 | Peck |
| 4,333,444 A * | 6/1982 | Sell et al. .................... 126/623 |
| 5,041,717 A | 8/1991 | Shay, III et al. |
| 5,379,596 A * | 1/1995 | Grayson ...................... 62/3.62 |
| 5,685,095 A * | 11/1997 | DeMasi ........................ 40/320 |
| 7,002,319 B2 * | 2/2006 | Hinteregger ................ 320/110 |
| 7,317,176 B2 * | 1/2008 | Boucher ..................... 219/546 |
| 2004/0080151 A1 * | 4/2004 | Hunt ........................... 280/809 |

FOREIGN PATENT DOCUMENTS

WO WO 2004/080776 9/2004

* cited by examiner

*Primary Examiner*—S. Joseph Morano
*Assistant Examiner*—Robert J McCarry, Jr.
(74) *Attorney, Agent, or Firm*—Ward & Olivo

(57) ABSTRACT

The present invention is an improved ski lift. The ski lift contains a solar power source which is attached to one or more heating elements. The heating elements heat a passenger's hands during transit up the mountain. As a result, the passenger is made more comfortable during transit, increasing his or her overall skiing experience.

20 Claims, 5 Drawing Sheets

HEATED SKI LIFT

FIELD OF THE INVENTION

The invention relates generally to the field of ski lifts. More specifically, the current invention discloses an improved ski lift comprising one or more remotely powered heaters disposed on a ski lift to keep a user's hands warm during transit.

BACKGROUND OF THE INVENTION

Skiing is a favorite winter sport and one of the oldest forms of transportation on snow covered grounds. In general, a recreational skier travels downhill on snow laden paths or trails. Accordingly, skiing is necessarily practiced in frigid weather. Mountain slopes often reach temperatures at or below zero degrees, the effects of which can be exacerbated by strong winds which further lower the temperature.

The frigid temperature can have a serious negative impact on both a skier's performance on the slope and the overall enjoyment of skiing. To combat the cold temperatures, skiers typically utilize multiple layers of clothing made from special materials, hats, gloves, boots, scarves, and the like. In addition, a skier typically exerts a large amount of energy, which is dissipated as body heat. As a result, a skier does not often feel the adverse effects of the cold temperatures during a ski run.

The same does not hold true when the skier is inactive or between runs. For example, ski resorts typically utilize ski lifts to facilitate a skier's ascent to the top of a mountain. Such systems, known as cableway systems, are well known. In general, a multiplicity of suspension-gear mechanisms is supported on a conveying cable which bears a chair for transporting a plurality of skiers to the top of a mountain. Accordingly, a skier who utilizes a chair lift is inactive during the ascent.

The resulting inactivity leads to a drop in body heat generation. As a result, the additional clothing made from special materials, hats, gloves, boots, scarves, and the like do not adequately insulate the skier from the cold temperatures, and the skier acutely feels the cold.

There have been several attempts to alleviate this problem. For instance, cable cars are well known. Cable cars provide a passenger with an enclosed compartment which protects the passenger from the elements. However, cable cars are large and bulky. In addition, cable car systems are extremely expensive. As a result, they are only utilized in a few ski resorts.

In addition, conventional ski lifts may be fitted with a heater disposed within the seat back or head rest. Such systems, however, rely on inductive power transmission and are only capable of heating a passenger's back and head. Such a system fails to adequately heat a passenger's hands. This is especially problematic because the extremities (i.e., the hands and feet) dissipate heat much faster than other portions of the body.

In light of the foregoing, there exists a clear need in the art for an improved ski lift which can adequately heat a passenger's extremities, particularly the hands. In addition, there is a clear need in the art for a ski lift which utilizes a cheap, safe energy source to provide heat to a passenger's hands. The present invention provides an improved ski lift which combines both of the aforementioned benefits without any of the shortcomings associated with traditional ski lifts.

SUMMARY OF THE INVENTION

The present invention comprises a system for providing heat to a skier's hands during transit on a ski lift. The system comprises a ski lift chair comprising a pull down safety bar and a heating system coupled to the safety bar.

Ski lift chairs having pull down safety bars are well known. Typically the safety bar is pivoted on the back of the ski chair and left in the raised position by the previous occupants when they got off of the chair at the top of the ski lift. When the new occupants load onto the returned chair at the bottom of the lift, they seat themselves on the chair oncoming from behind. A new occupant then pulls the pivoted safety bar down to a position across the front of them to secure them in place during the ride up the mountain.

Attached to the ski lift chair is at least one heat source. It is contemplated that any heat source can be utilized in accordance with the present invention, however, as described below the preferred heat source is a radiative heat source. Optional touch sensors or pressure sensors can be coupled to the heat source to allow a passenger to manually activate the heat source.

A power source is attached to the ski lift and electrically coupled to the heat source. The power source, which can be any power source, provides the means for operating the heat source. As described below, in the preferred embodiment the power source is solar powered. The solar cell provides electrical current to the heat source in a process known in the art as photovoltaic conversion. Photovoltaic conversion is the direct conversion of light into electricity at the atomic level. Some materials exhibit a property known as the photoelectric effect that causes them to absorb photons of light and release electrons. When these free electrons are captured, an electric current is generated that can be used as electricity.

An optional secondary power source can be added to the solar powered power source of the present invention. This secondary source, which can be any type of power source (e.g., a series of alkaline batteries), can be electrically coupled to the primary power source via an ammeter. The ammeter, which measures the current of the system, provides additional current from the secondary power source if the primary power source does not generate (or have stored) enough power to provide adequate heat to a passenger's hands.

Further, it is contemplated that the system can be designed to be portable. Such a system would contain additional attaching means for the heat source and the power source.

In operation, the photovoltaic cell converts solar energy into electrical current. The electrical current passes to the heat source, such as a radiative heat source. The heat source generates heat which dissipates through the ski lift safety bar, providing heat to a passenger that has placed his or her hands on the bar. If the system is equipped with an optional touch or pressure sensor, the heat source will not generate heat until the passenger activates the heat source via touch or pressure.

In light of the foregoing, it is an object of the invention to create an improved ski lift.

Still another object of the current invention is to create a ski lift which comprises a heating mechanism for heating a passenger's hands.

Further, it is an object of the current invention to create an improved ski lift which comprises a solar powered electrical source.

Yet another object of the present invention is to improve the overall experience of a skier by providing warmth during periods of inactivity.

Still another object of the present invention is to provide a portable hand warmer to a skier.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention. Reference is now made of the drawings in which:

DETAILED DESCRIPTION OF THE PREFERRED EMBODIMENT

A detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein that define the scope of the present invention.

Initially, the use of the terms "ski lift," "chair lift," "chair," cableway car," and the like are not meant to limit the scope of the present invention. Rather, the terms are used interchangeably and are meant to be merely illustrative in nature of certain aspects of the present invention.

Moreover, well known methods, procedures, and substances for both carrying out the objectives of the present invention and illustrating the preferred embodiment are incorporated herein but have not been described in detail as not to unnecessarily obscure aspects of the present invention. The following presents a detailed description of a preferred embodiment of the present invention.

Figure 1:
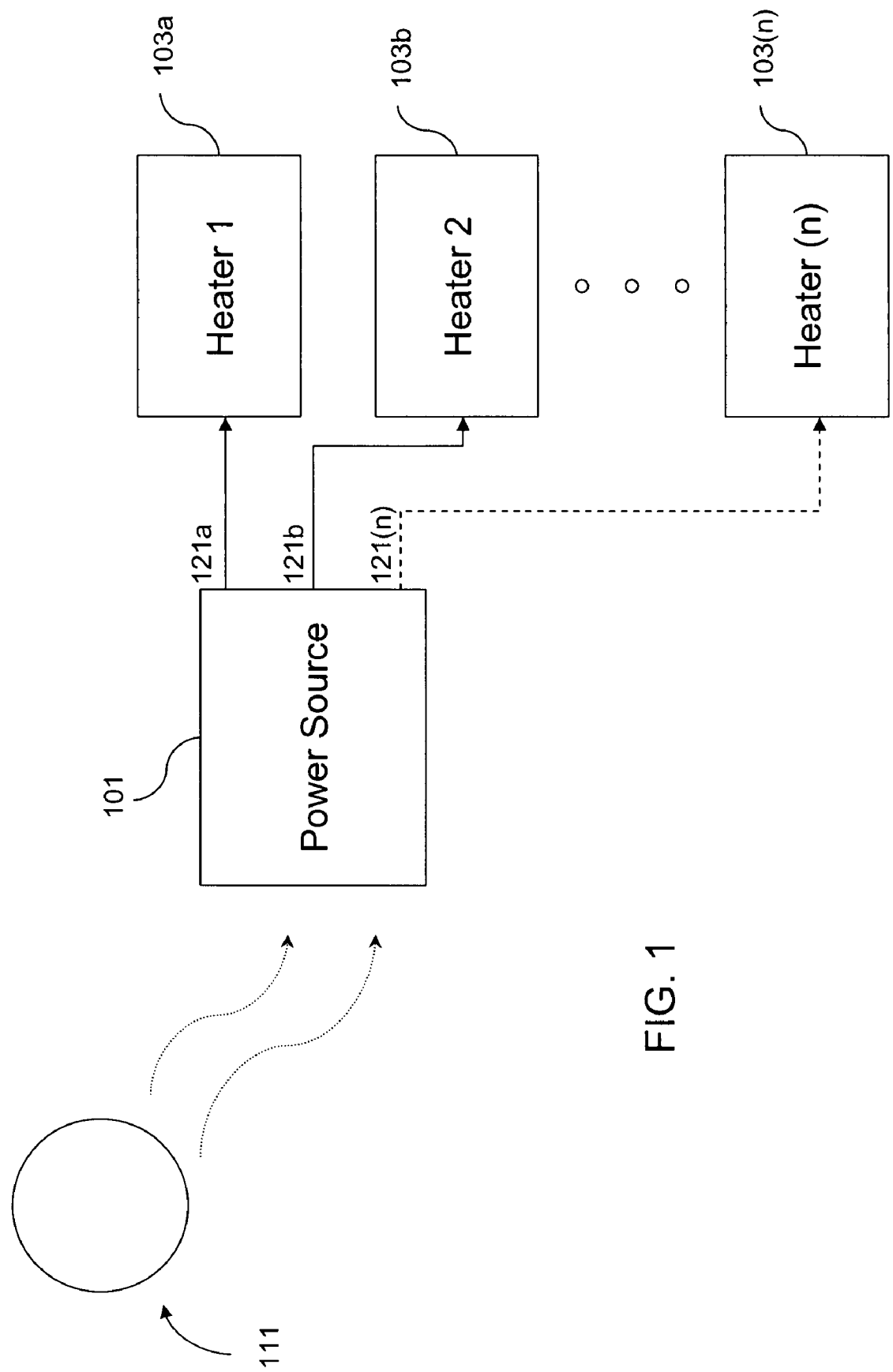
FIG. 1 shows a block diagram of one embodiment in accordance with the present invention.

Referring now to FIG. 1, depicted is a general block diagram of a portion of the system in accordance with the present invention. The system comprises power source 101 and one or more heat sources 103a-n.

In the preferred embodiment, power source 101 comprises a photovoltaic, or solar cell. Solar cells are well known in the art, and are made from the same kinds of semiconductor materials, such as silicon, used in the microelectronics industry. For solar cells, a thin semiconductor wafer is specially treated to form an electric field, positive on one side and negative on the other.

Alternatively, power source 101 can comprise a number of solar cells electrically connected to each other and mounted in a support structure or frame. This configuration is known as a photovoltaic module. Modules are designed to supply electricity at a certain voltage, such as a common 12 volt system. As is known, the current produced is directly dependent on how much light strikes the module.

It is contemplated, however, that any power source can be utilized in accordance with the present invention. For example, power source 101 can comprise a battery. More specifically, power source 101 can be a disposable, alkaline or lithium primary battery or a rechargeable battery such as a nickel/cadmium battery. Any other well known size or type of battery can be used without departing from the spirit of the invention.

In the preferred embodiment, power source 101 further comprises a means for storing electrical charge such as a capacitor (not shown). Advantageously, utilizing a capacitor allows a solar power source to store excess electrical current which can be dissipated at a later time, such as when gathering solar energy is not possible.

In operation, when light energy 111 strikes the solar cell, electrons are knocked loose from the atoms in the semiconductor material. If electrical conductors are attached to the positive and negative sides, forming an electrical circuit, the electrons can be captured in the form of an electric current—that is, electricity as depicted by 121a-n. This electricity can then be used to power a load, such as a plurality of heat sources 103a-n.

Heat sources 103a-n can be any commonly known heat source. However, in the preferred embodiment, heat source 103 is an electric heater. For example, heat sources 103a-n can comprise a radiative heater. Radiative heaters contain a heating element that reaches high temperature.

The heating element is a resistor comprised of metal alloy wire, non-metallic carbon compounds, or printed circuits. The heating element is packaged with a reflector inside a glass envelope. The element emits infrared radiation that travels through the atmosphere until it contacts an appropriate absorbing surface such as metal, where it is converted to heat.

As another example, heat sources 103a-n can comprise a convection heater. Convection heaters, like radiative heaters, contain a heating element. The heating element heats the air surrounding it by conduction. Since hot air is less dense than cold air, it rises. As it rises the hot air is replaced by cooler air, which sets up a constant current of hot air available to heat an appropriate surface.

It is contemplated, however, that any other heat source can be utilized in accordance with the present invention. Indeed, heat sources 103a-n can comprise combinations of well known heaters. For example, heat source 103a can comprise a radiative heater while heat source 103b can comprise a convection heater.

Figure 2:
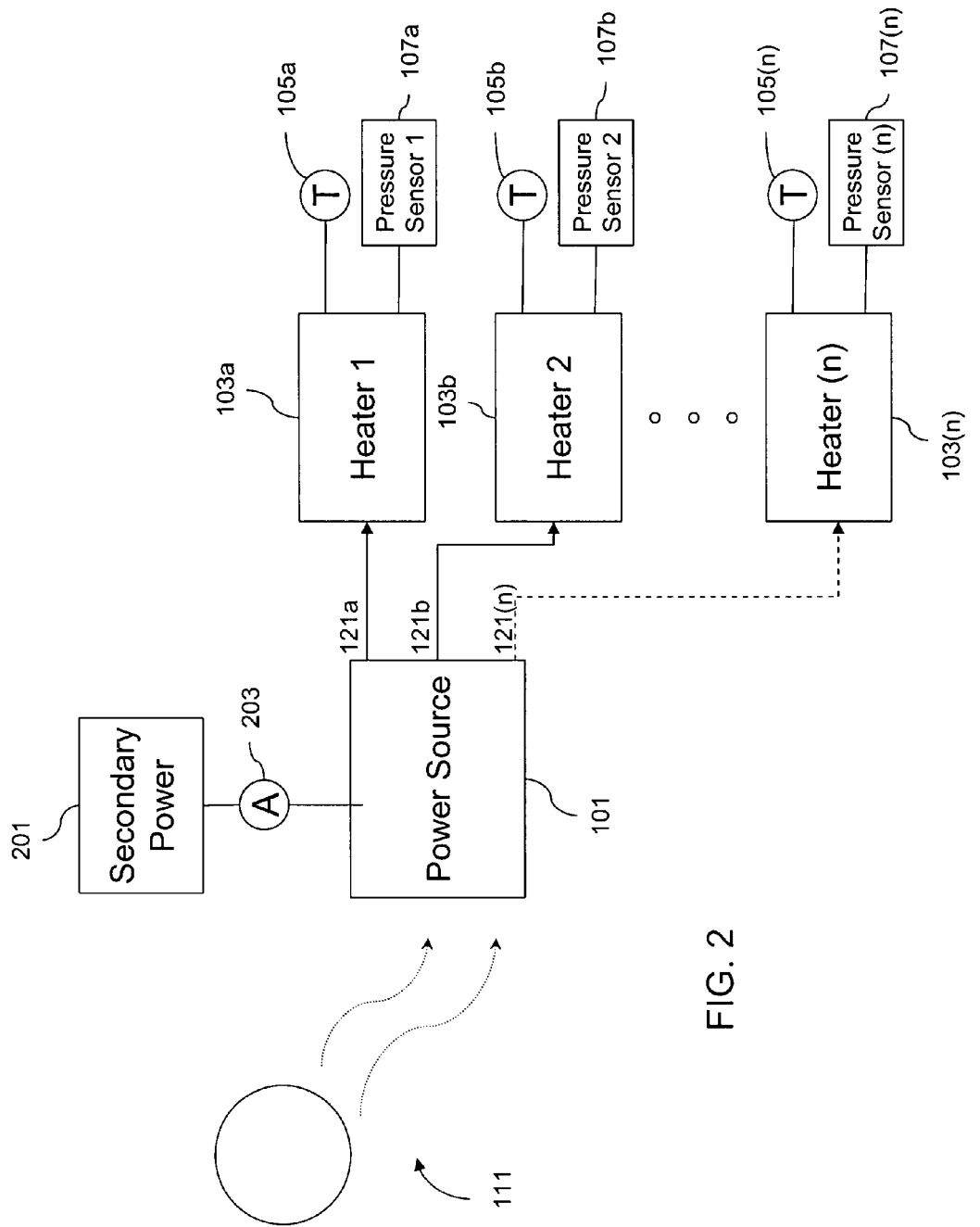
FIG. 2 shows a block diagram of the preferred embodiment of the present invention.

Referring now to FIG. 2, depicted is an alternative embodiment of the heating system of the present invention. The heating system comprises power source 101 and heat sources 103a-n as described in relation to FIG. 1. However, in this embodiment, the heating system further comprises secondary power source 201, ammeter 203, temperature sensors 105a-n and pressure sensors 107a-n.

Secondary power source 201 can comprise any known power source. For example, secondary power source 201 can comprise a battery. More specifically, secondary power source 201 can be a disposable, alkaline or lithium primary battery or a rechargeable secondary battery such as a nickel/ cadmium battery. Any other well known size or type of battery can be used without departing from the spirit of the invention.

In the preferred embodiment, power source 201 and secondary power source 203 are electrically connected by ammeter 203. Ammeter 203 is utilized to measure the current produced by the overall heat system overall.

If the current measured by ammeter 203 falls below a specified current limit, it transmits a signal which activates secondary power source 201. If ammeter 203 measures a current which is within a specified range, no signal is sent and secondary power source 301 remains inactive. In this way, secondary power source 201 serves as a backup power source when power source 101 does not provide an adequate electrical current.

While any specified current limit threshold can be chosen in accordance with the present invention, in the preferred embodiment the current threshold is in a range of 50%-85%.

In the preferred embodiment, heat sources 103a-n are electrically connected to temperature sensors 105a-n. Temperature sensors 105a-n are well known in the art and are utilized to measure the heat produced by heat sources 103a-n.

If the temperature measured by temperature sensors 105a-n fall below a specified temperature limit, it transmits a signal which activates heat sources 103a-n. If temperature sensors 105a-n measure a temperature which is above a specified range, a signal is sent which deactivates heat sources 103a-n. In this way, temperature sensors 105a-n serve as a means of protecting a passenger's hands from being burned.

While any specified temperature threshold can be chosen in accordance with the present invention, the lower limit of the temperature range should be above body temperature but below the temperature which can burn a passenger's hands.

Figure 4:
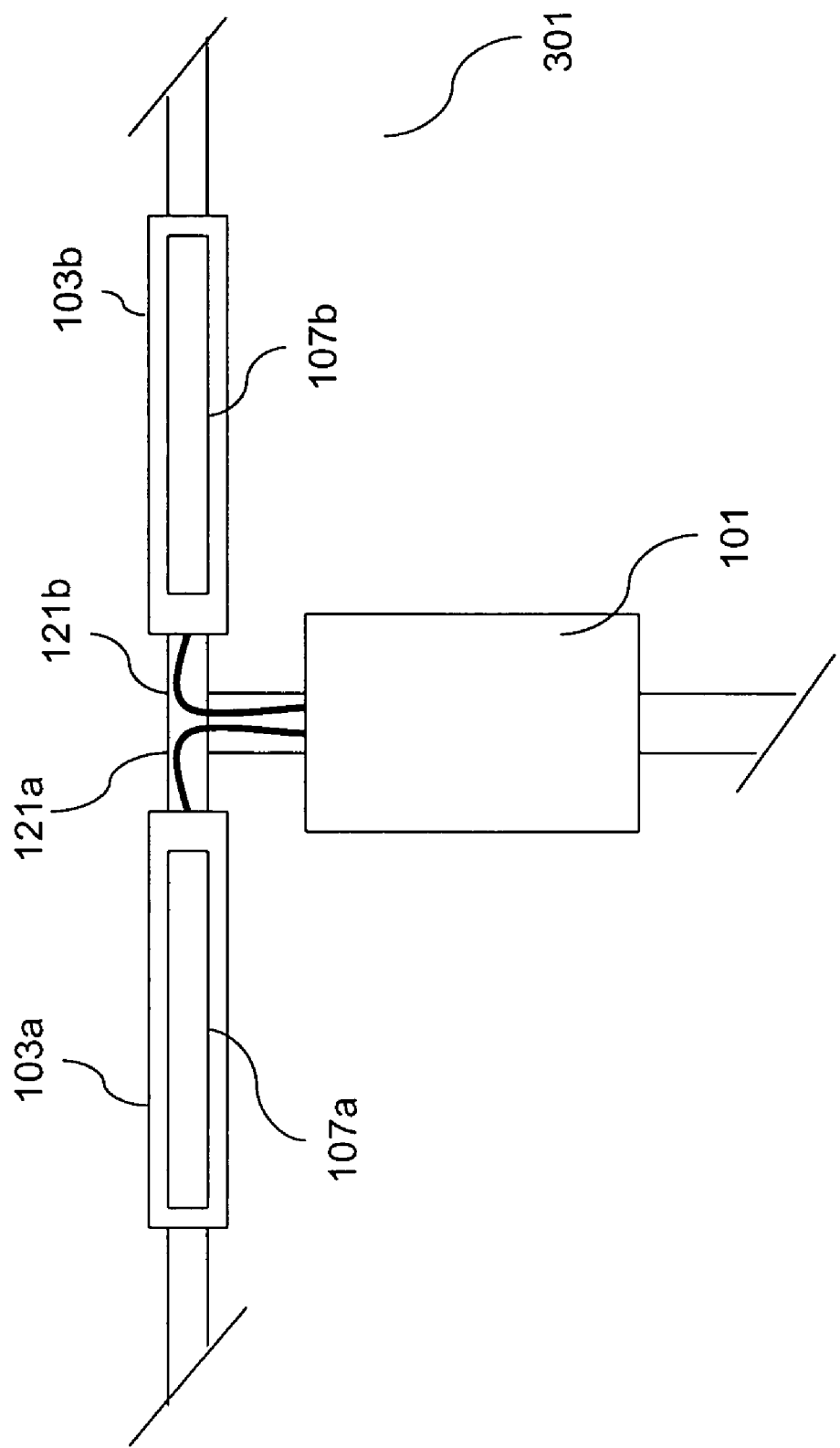
FIG. 4 depicts an exploded view of the orientation of the heat system on a ski lift safety bar in accordance with the preferred embodiment of the present invention.

Optional pressure sensors 107a-n are well known mechanisms which act as a power switch for the heating system of the current invention. Pressure sensors are electrically coupled to heat sources 103a-n and are externally accessible by a passenger as depicted in FIG. 4. When a passenger applies pressure to pressure sensor by placing his or her hands on it, pressure sensors 107a-n transmit a signal to heat sources 103a-n indicating that heat should be provided. When the pressure sensor is inactive, no signal is sent and no heat is produced.

Figure 3:
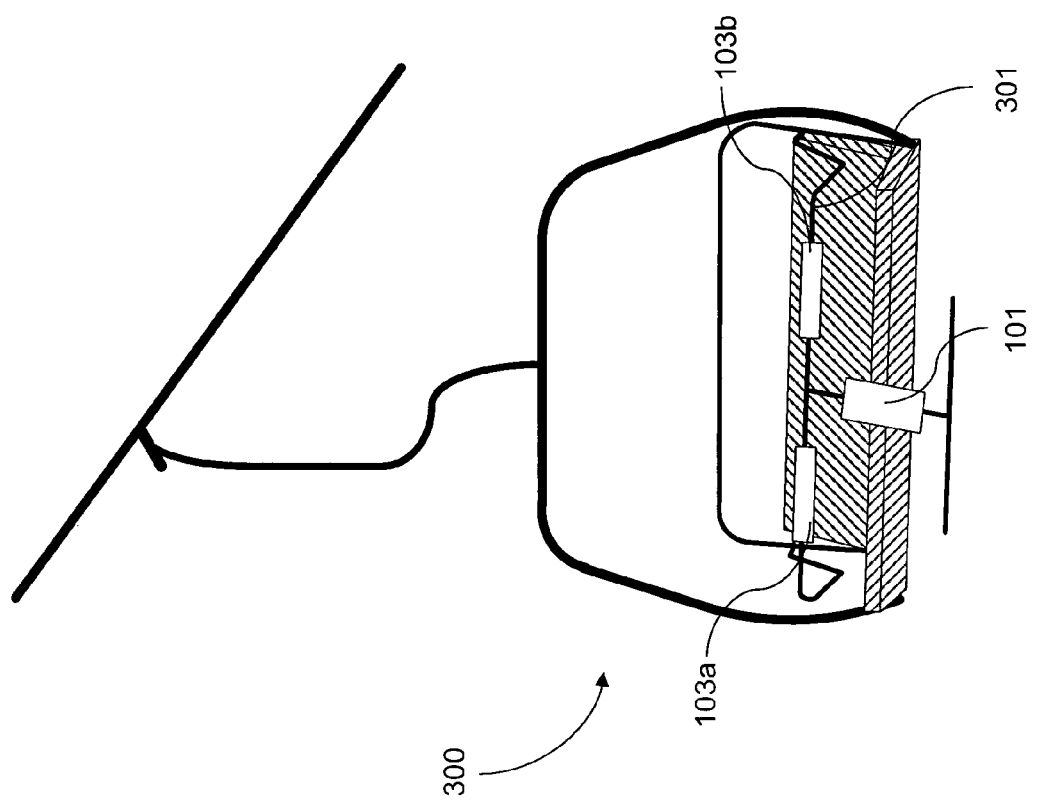
FIG. 3 shows the orientation of the various elements of the system in accordance with the preferred embodiment of the present invention.

FIGS. 3-4 depict the preferred orientation of the overall system of the present invention. As shown in FIG. 3, ski lift 300 comprises safety bar 301. Ski lifts are well known, and are disclosed in, for example, U.S. Pat. No. 5,685,095, the entire contents of which are incorporated by reference. Safety bar 301 comprises heat sources 103a-b and power source 101. In this example, heat sources 103a-b and power source 101 are permanently attached, however, the heating system can be designed to be portable. More specifically, the heating system of the present invention can be permanently attached to ski lift 300 via adhesive or removably attached via a snap-on means, a clip-on means, or the like.

As depicted in FIG. 4, pressure sensor 107a is oriented for ease of activation by a passenger. In addition, as is well known, pressure sensors 107a and 107b can be replaced by touch sensors (not pictured). Such sensors are well known, and operate in a manner similar to pressure sensors 107a and 107b.

Figure 5:
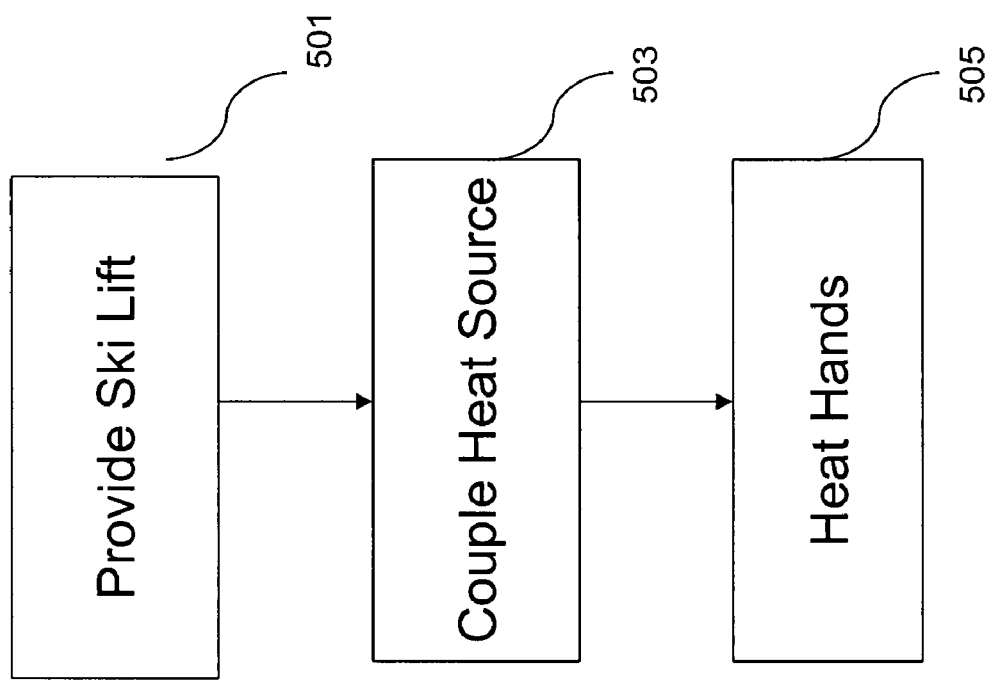
FIG. 5 is a flow chart of a method utilizing the disclosed system in accordance with the present invention.

Finally, FIG. 5 depicts a method of heating a ski lift in accordance with the present invention. In general, a ski lift chair comprising a pull down safety bar is provided 501. Preferably, at least one heat source is integrated into the pull down safety bar, however, the heat source can be removably attached or attached at a different portion of the ski lift. Next, a power source which is electrically coupled to heat source is provided and attached to the ski lift chair 503. As with the heat source, the power source can be removably attached or attached at a different portion of the ski lift. Finally, the power source provides electrical current to the heat source which is dissipated through the ski lift and up into a passenger's hands as depicted by step 505.

Advantageously, the present invention provides heat to a passenger's hands during a long period of inactivity. As a result, the passenger does not feel the adverse effects of the weather, allowing for a more pleasurable skiing experience.

What is claimed is:

1. A system for heating a passenger on a ski lift comprising:
a power source coupled to said ski lift, wherein said ski lift comprises a chair coupled to a safety bar; and
at least one heat source coupled to said safety bar and electrically coupled to said power source;
wherein said heat source comprises a pressure sensor,
wherein said pressure sensor senses pressure applied to said safety bar, wherein said pressure sensor transmits a signal to said heat source in response to pressure being applied to said safety bar, wherein said heat source provides heat to said safety bar in response to receiving said signal from said pressure sensor.

2. The system of claim 1, wherein said power source is solar powered.

3. The system of claim 1, wherein said heat source further comprises a temperature sensor, wherein said temperature sensor transmits a signal to said heat source when a temperature of said heat source is below a first temperature or above a second temperature, wherein said signal provides power to said heat source when said temperature is below said first temperature or said signal removes power from said heat source when said temperature is above said second temperature.

4. The system of claim 1, wherein said heat source is selected from the group consisting of a radiative heater, a convection heater, and a forced convection heater.

5. A system for heating a passenger on a ski lift comprising:
a power source coupled to said ski lift; and
at least one heat source coupled to said ski lift and electrically coupled to said power source;
wherein said heat source comprises a touch sensor,
wherein said touch sensor receives information regarding pressure applied to said safety bar, wherein said touch sensor transmits a signal to said heat source in response to pressure being applied to said safety bar, wherein said heat source provides heat to said safety bar in response to receiving said signal from said touch sensor.

6. The system of claim 5, wherein said power source is solar powered.

7. The system of claim 5, wherein said heat source further comprises a temperature sensor, wherein said temperature sensor transmits a signal to said heat source when a temperature of said heat source is below a first temperature or above a second temperature, wherein said signal provides power to said heat source when said temperature is below said first temperature or said signal removes power from said heat source when said temperature is above said second temperature.

8. The system of claim 5, wherein said heat source is selected from the group consisting of a radiative heater, a convection heater, and a forced convection heater.

9. A system for heating a passenger on a ski lift comprising:
a chair coupled to said ski lift, wherein said chair comprises a safety bar;

a power source coupled to said safety bar on said ski lift, wherein said power source resides on said chair; and at least one heat source coupled to said safety bar on said ski lift and electrically coupled to said power source;

a secondary power source electrically coupled to said power source, wherein said secondary power source resides on said chair; and an ammeter coupled to said power source and said secondary power source, wherein said ammeter measures current produced by said power source, wherein said ammeter sends a signal to said secondary power source in response to said current falling below a predetermined threshold, wherein said signal activates said secondary power source in response to receiving said signal, and wherein said secondary power source supplies current to said heat source to heat said safety bar on said chair.

10. The system of claim 9, wherein said secondary power source is a battery.

11. A method of heating a ski lift comprising:
providing a ski lift chair with at least one heat source, wherein said heat source comprises a pressure sensor, and wherein said ski lift chair comprises a safety bar;

providing a power source which is electrically coupled to said at least one heat source wherein said power source resides on said ski lift chair; and heating said ski lift with said heat source, wherein said pressure sensor senses pressure being applied to said safety bar, wherein said pressure sensor transmits a signal to said heat source in response to pressure being applied to said safety bar, wherein said heat source provides heat to said safety bar in response to receiving said signal from said pressure sensor.

12. The method of claim 11, wherein said power source is solar powered.

13. The method of claim 11, wherein said heat source further comprises a temperature sensor, wherein said temperature sensor transmits a signal to said heat source when a temperature of said heat source is below a first temperature or above a second temperature, wherein said signal provides power to said heat source when said temperature is below said first temperature or said signal removes power from said heat source when said temperature is above said second temperature.

14. The method of claim 11, wherein said heat source is selected from the group consisting of a radiative heater, a convection heater, and a forced convection heater.

15. A method of heating a ski lift comprising:
providing a ski lift chair with at least one heat source, wherein said heat source comprises a touch sensor, and wherein said ski lift chair comprises a safety bar;

providing a power source which is electrically coupled to said at least one heat source, wherein said power source resides on said ski lift chair; and heating said ski lift with said heat source, wherein said touch sensor receives information regarding pressure applied to said safety bar, wherein said touch sensor transmits a signal to said heat source in response to pressure being applied to said safety bar, wherein said heat source provides heat to said safety bar in response to receiving said signal from said touch sensor.

16. The method of claim 15, wherein said power source is solar powered.

17. The method of claim 15, wherein said heat source further comprises a temperature sensor.

18. The method of claim 15, wherein said heat source is selected from the group consisting of a radiative heater, a convection heater, and a forced convection heater.

19. A method of heating a ski lift comprising:
providing a ski lift chair with at least one heat source, wherein said chair comprises a safety bar;

providing a power source which is electrically coupled to said at least one heat source, wherein said power source resides on said ski lift chair;

providing a secondary power source electrically coupled to said power source, wherein said secondary power source resides on said ski lift chair;

providing an ammeter coupled to said power source and said secondary power source; and heating said ski lift with said heat source, wherein said ammeter measures current produced by said power source, wherein said ammeter sends a signal to said secondary power source in response to said current falling below a predetermined threshold, and wherein said signal activates said secondary power source to provide current to said heat source in response to receiving said signal, and wherein said secondary power source supplies current to said heat source to heat said safety bar on said chair.

20. The method of claim 19, wherein said secondary power source is a battery.

* * * * *